May 10, 1966 K. G. BROWN 3,250,431
VENDING MACHINE

Filed Dec. 8, 1964 2 Sheets-Sheet 1

INVENTOR.
KENNETH G. BROWN
BY James P. Malone

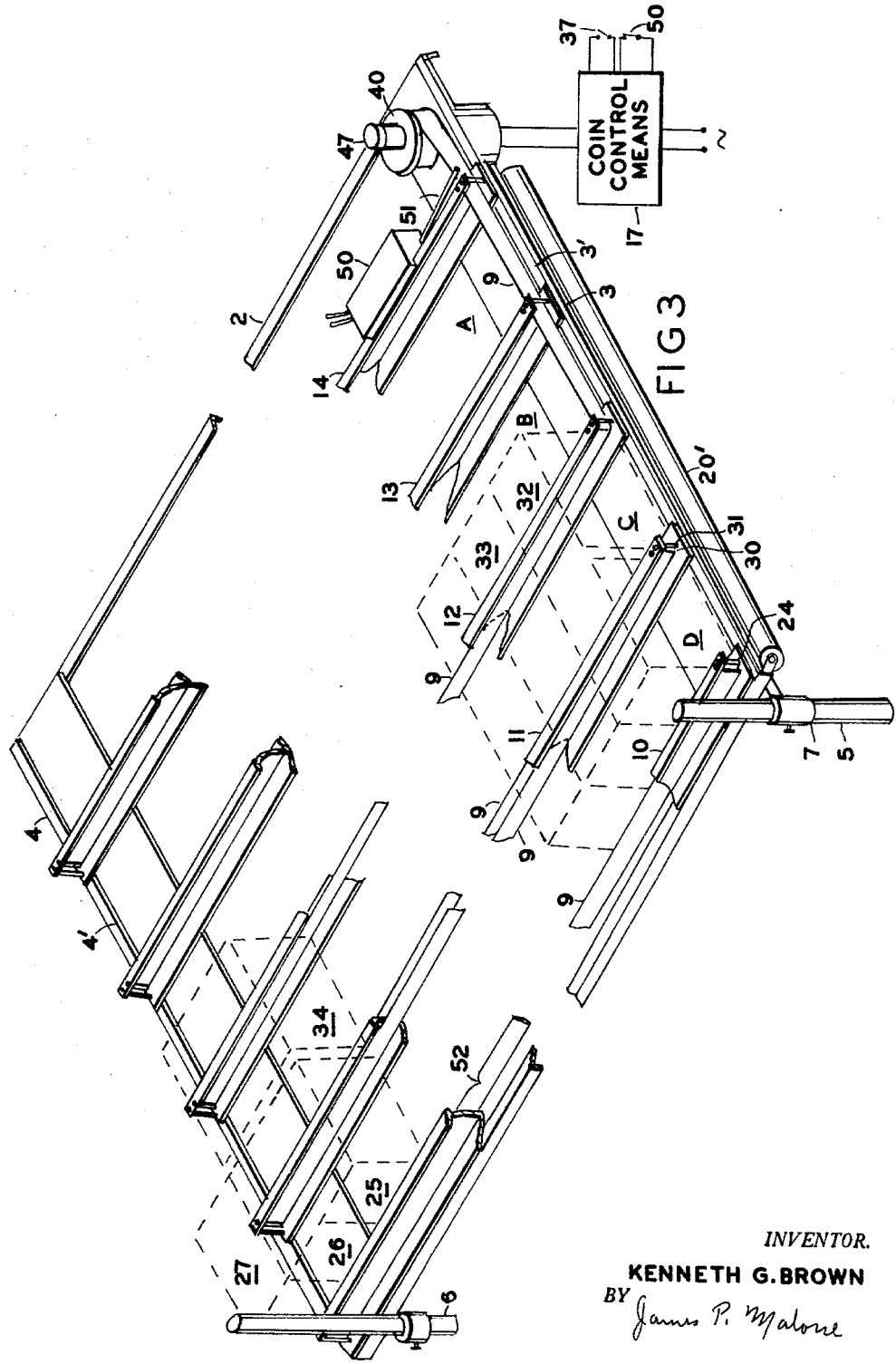

United States Patent Office 3,250,431
Patented May 10, 1966

3,250,431
VENDING MACHINE
Kenneth G. Brown, Wickham Ave., Mattituck,
Long Island, N.Y.
Filed Dec. 8, 1964, Ser. No. 416,716
2 Claims. (Cl. 221—123)

This invention relates to vending machines for packages or articles and more particularly for such means comprising new and improved delivery chute means.

This application is an improvement of my Patent No. 2,990,974, granted July 4, 1961, for Article Dispensing Means and my copending application, Serial No. 307,574, filed September 9, 1963, for Package Dispensing Means.

The prior patent and application describe vending machine means for delivering packages for instance, milk cartons, egg cartons and other similar packages. Both the patent and application have a plurality of horizontal racks which are stacked one above the other to dispense various categories of packages. The packages are mounted in a column on the racks and they are delivered off the end of the rack by motorized tape means which pushes the articles or packages off the ends of the racks.

In the patent, the articles were pushed off one end of the rack off into a stationary delivery chute which delivered them to a delivery door.

In my copending application, a elevator mechanism was provided at the end of the rack to deliver the articles to the delivery door with the minimum possibility of breakage. The elevator mechanism was a complicated and expensive part of the machine but was desirable to avoid the breakage of fragile items such as cartons of eggs in the stationary delivery chute.

The present invention is an improvement over my prior inventions in that it incorporates a new delivery chute means which is arranged to deliver the packages without breakage without the necessity for an expensive or complicated elevator means.

The present invention generally comprises a sheet-like chute member which is pivotally mounted at the upper rear of the machine and which curves downwardly toward the bottom of the machine and under the racks in the manner of a ski slope with a gradual curvature. When the articles are pushed off the rack, they land on the pivoted and yieldably mounted delivery chute, with a gentle glancing contact and slide down to the delivery door.

Since the delivery chute is pivotally, yieldably, mounted and due to the gentle curvature of the chute, there is a very gentle contact and breakage of fragile items are substantially eliminated. The yielding oscillating movement of the flexible chute actuates a switch which turns off the motor means which pushes the article off the rack. Rollers are provided along the ends of the rack in order to facilitate the exit of a single package off the rack so that the package will actuate the chute and stop the motor drive before a second package is pushed off the rack.

Accordingly, a principal object of the invention is to provide new and improved vending machines for packages and articles.

Another object of the invention is to provide new and improved vending machines for fragile packages such as dairy products and eggs.

Another object of the invention is to provide new and improved delivery chute means for vending machines.

Another object of the invention is to provide new and improved delivery chute control means for vending machines.

Another object of the invention is to provide new and improved delivery chute means for vending machines comprising a pivotally mounted, flexible, yieldable sheet-like chute.

Another object of the invention is to provide new and improved delivery chute means for vending machines having a plurality of racks for packages of different products and motor means to push a selected category of packages so that one of said packages falls off one of said racks, a flexible, yieldable sheet-like chute member pivotally mounted at its upper end at the rear of the machine, said chute member extending under said racks to a delivery location, and a switch adapted to be actuated by movement of said chute member to turn off said motor means which pushed said one package off the rack.

These and other objects of the invention will be apparent from the following specification and drawings of which:

FIGURE 3 is a detail view illustrating the rack construction of the invention.

Figure 2:
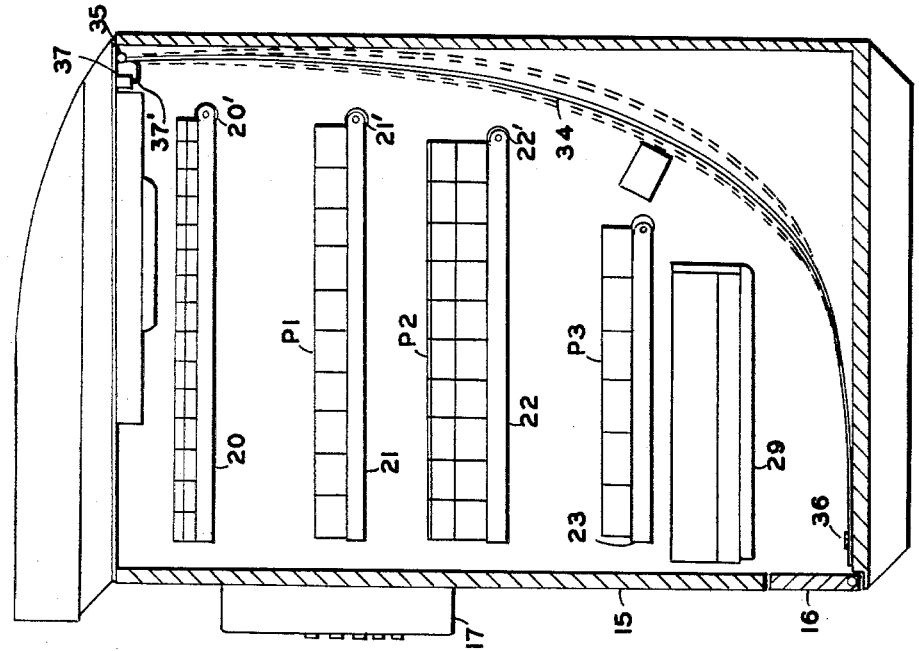
FIGURE 2 is an enlarged side sectional view of an embodiment of the invention, with one side removed.
Figure 1:
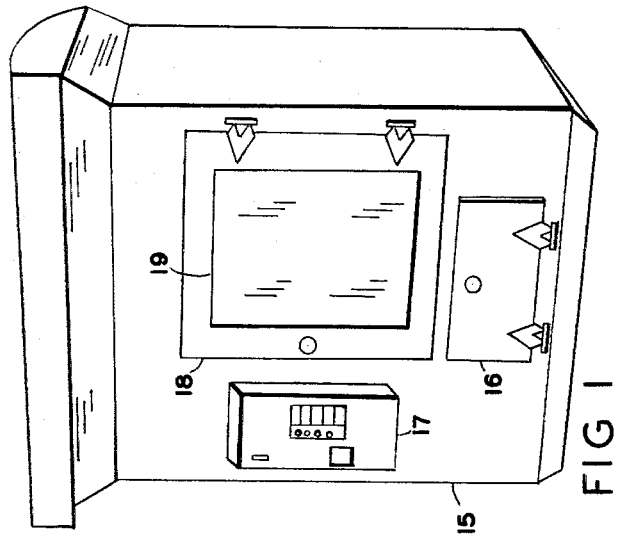
FIGURE 1 is a front view of an embodiment of the invention.

Referring to the figures, the invention generally comprises a casing 15, which may be a relatively large refrigerator casing having a delivery door 16 at the lower front thereof. A conventional coin control mechanism 17 is mounted on the front of the casing which also contains a large door 18 for loading the machine. The door 18 preferably has a glass window 19 which allows the purchaser to inspect the products inside. The coin control box 17 may be a conventional device for use in vending marhines such as manufactured by National Rejectors, Inc., St. Louis, Mo., or as shown in Patents 2,058,637, 2,371,316, and 2,564,552.

Referring to FIGURE 2, the interior of the vending machine comprises a plurality of horizontal racks 20, 21, 22, and 23. Each of the racks comprise a plurality of divider members and ejecting tape which will be discussed in connection with FIGURE 3. Various categories of products P1, P2, P3, may be placed on the racks. Each rack has its own ejecting tape and motor which are started by the conventional coin control mechanism 17, as described in my above patent and application. Each of the racks have a roller member 20', 21', 22', etc., mounted at the exit or rear end of the rack. The purpose of the roller member is to facilitate the exit of the packages one at a time. In other words, when the leading package passes over the roller the balance point changes and it exits quickly. This permits a more positive motor control and eliminates the possibility of more than one package being pushed off at a time. A storage rack 29 is also provided.

The delivery chute 34 which may comprise a sheet of Plexiglas extending the full width of the machine, is pivotally mounted at the upper rear of the machine on the rod member 35 and extends down with a gradual curvature under the racks to the front of the machine and the vending machine delivery door. The chute is fastened to the floor of the machine for instance, by a screw 36 or other fastening means. The chute is not connected to the sides of the case and is free to oscillate. The lower racks are set back to permit passage of packages along the gradual curvature of the chute without interference. The pivotal mounting of the delivery chute and its light flexible construction permits it to yield upon receiving the package and this motion actuates the feeler arm 37' of switch 37 which is connected to cut off the motor which is pushing the package off the rack. Due to the gentle curvature and yieldable mounting the packages contact the chute with a very gentle impact somewhat like the impact of a ski jumper upon a ski slope. Upon contact of the package the chute oscillates as shown by the dotted lines and actuates the switch 37 at least several times. Switch 37 is a momentary motor stop switch. In practice it has been found that fragile items such as cartons of eggs can be delivered without any breakage.

In operation, the customer inserts a coin and chooses the product with the conventional coin control mechanism 17 which then starts the selected motor going which rolls up the tape connected to it and pushes one of the selected products off its rack. When the product hits the chute, the chute oscillates opening the switch 37 which is of the momentary type. The control circuit is of the conventional type arranged so that when the motor stops it cannot be started again until a new coin is inserted.

Referring to FIGURE 3, the racks, as also shown in my previously mentioned patent and application, comprise a rectangular frame having side members 1 and 2 and front and back members 3 and 4. The frame is mounted on vertical standards or pipes 5 and 6 or to the walls of the box so that a number of frames may be mounted one above the other. The frames may be connected to the standards with adjustable brackets 7 so that the vertical spacing may be adjusted to accommodate different size articles or packages.

A plurality of parallel rails 10, 11, 12, 13, and 14 are mounted on the front and back members 3 and 4. The front and back members having slots 3' and 4' so that the rails may be fastened to the front and back members with adjustable spacing to accommodate different size articles. The rails may be of extruded aluminum and have a general inverted T-shape the horizontal portion being on the bottom.

The tape 9 is anchored at one end to the frame, for instance around the guide pin 24 at the end of the rail 10, FIGURE 3. The tape then extends along the inside of the rail 10 around the boxes 25, 26, 27, then forwardly between these boxes and the rail 11, then through the space 30, between the end of rail 11 and pin 31, then around the boxes 32, 33, 34, and so forth, then forwardly down between the other side of these boxes and the rail 12.

Since there are no packages shown in the channels A and B between the rails 12, and 13 and 13 and 14, the tape then extends directly across the front of these channels A and B, the tape would extend around these articles in the same manner as described in connection with the channels C and D.

All of the channels are open at the rear end so that an article falling out the rear end of any channel will be ejected onto the delivery chute 34.

A clutch 47 connects the motor shaft and the spool 40. This clutch may be a key pin device which connects keyed portions of the motor shaft and the spool. The clutch is not disengaged during the operation. It is only used to disconnect the spool when loading the machine.

The showing of FIGURE 3 only shows one rack. There may be any number of racks stacked with suitable vertical spacing on the standards 5 and 6. The racks are made with the maximum spacing between all parts for providing the maximum ventilation of the articles for proper refrigeration.

A roller 20' is mounted at the exit edge of each rack. The roller is preferably a ball bearing mounting and freely rotatable. The purpose of the roller is to cause quick positive exit of packages when point of balance of equilibrium is passed onto the roller. As soon as the package hits the chute, the pushing motor means is turned off. The roller assures that not more than one package will be pushed off the rack at any one time.

The operation of the rack is as follows:

The rack is shown with the channels C and D loaded with the articles and the channels A and B empty. The tape 9 is anchored in the end of the rail 10 and extends around the articles in channel D and around the articles in channel C, the other end of the tape being connected to the motor driven spool 40. When the motor is actuated, the spool 40 will wind counter-clockwise and the tape will eject the first article in the channel.

The articles in the channel B are emptied. This is because the tape, is effectively anchored at the end of the rail 30 due to differential friction. The tape is preferably of Mylar or other equivalent material having good wearing quantities.

An "empty" switch 50 is provided. This switch may be a microswitch having an extending arm 51 which rides on top of the tape. The tape is notched as shown at point 52 the position of the notch being chosen so that when all the articles are delivered, the notch 52 will actuate the switch arm 51. Switch 50 is connected in series with the motor stop switch 37 in a conventional pushbutton type stop circuit contained in the control box 17.

Therefore, the present invention provides new and improved vending machine means for fragile article which eliminates the use of complicated and expensive elevator mechanisms and which provides a delivery chute which is pivotally and yieldably mounted with a gentle curvature to receive and deliver the products with a minimum of impact.

Many modifications may be made by those who desire to practice the invention without departing from the scope thereof which is defined by the following claims:

I claim:
1. A vending machine comprising,
a cabinet,
a plurality of racks mounted inside said cabinet and extending from the front portion of said cabinet to predetermined distances from the rear of said cabinet,
pusher means connected to said racks to push a package off the rear end of said racks,
motor means to operate said pusher means.
a flexible chute member one end thereof mounted at the upper rear portion of said cabinet, said chute member extending downwardly and forwardly under said racks and attached to a point at the bottom of the front portion of said cabinet,
a delivery door in said cabinet adjacent the bottom of said cabinet and adjacent said point,
said chute being spaced predetermined distances from the rears of said racks so that a package falling off any of said racks will slide down on said chute safely to said delivery door, the impact of said package on said chute causing a movement of said flexible chute,
a stationary switch mounted in said cabinet, said switch having a feeler arm adapted to contact said flexible chute and be actuated by movement of said chute, said switch being connected to stop said motor means after one package has been delivered to said chute.
2. A vending machine as in claim 1 having roller means at the rear ends of said racks.

References Cited by the Examiner

UNITED STATES PATENTS

| | | | |
|---|---|---|---|
| 444,884 | 1/1891 | Howell | 193—7 |
| 1,927,217 | 9/1933 | Price | 209—74 |
| 2,252,493 | 8/1941 | Dennis | 221—193 |
| 2,681,842 | 6/1954 | Rabkin et al. | 221—131 |
| 2,705,144 | 3/1955 | Ridgway | 193—25 |
| 2,990,974 | 7/1961 | Brown | 221—103 |
| 3,064,856 | 11/1962 | Council | 221—103 |

RAPHAEL M. LUPO, *Primary Examiner.*

WALTER SOBIN, *Examiner.*